(12) United States Patent
Han et al.

(10) Patent No.: US 7,388,181 B2
(45) Date of Patent: Jun. 17, 2008

(54) APPARATUS FOR ADJUSTING APPLIED VOLTAGE IN DISPLAY SYSTEM USING DIFFRACTIVE OPTICAL MODULATOR

(75) Inventors: Kyu Bum Han, Gyeonggi-do (KR); In Jae Yeo, Gyeonggi-do (KR); Seung Won Ryu, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 32 days.

(21) Appl. No.: 11/588,876

(22) Filed: Oct. 27, 2006

(65) Prior Publication Data
US 2007/0101384 A1  May 3, 2007

(30) Foreign Application Priority Data
Oct. 28, 2005 (KR) .............. 10-2005-0102468
Nov. 18, 2005 (KR) .............. 10-2005-0110806

(51) Int. Cl.
*G01J 1/32* (2006.01)
(52) U.S. Cl. ............... 250/205; 250/237 G; 250/235; 250/216; 359/245; 359/260; 359/558

(58) Field of Classification Search ............... 250/205, 250/208.1, 214 VT, 237 G, 237 R, 216, 235, 250/214.1, 214 R; 359/237, 233, 245, 247, 359/260, 263, 558, 566, 640; 349/200–202; 345/84, 207, 906; 313/532, 103 R, 103 CM, 313/508
See application file for complete search history.

(56) References Cited
U.S. PATENT DOCUMENTS

| | | | |
|---|---|---|---|
| 6,504,651 B1 | 1/2003 | Takatori | |
| 6,583,915 B1 | 6/2003 | Hong et al. | |
| 7,170,668 B2 * | 1/2007 | Yun | ............... 359/291 |
| 2006/0279198 A1 * | 12/2006 | Yun et al. | ............... 313/495 |

* cited by examiner

*Primary Examiner*—Georgia Y. Epps
*Assistant Examiner*—Francis M Legasse, Jr.
(74) *Attorney, Agent, or Firm*—Christensen O'Connor Johnson Kindness PLLC

(57) ABSTRACT

Disclosed herein is an apparatus for adjusting applied voltage in a display system using a diffractive optical modulator. The apparatus for adjusting applied voltage can measure the intensity of diffracted light emitted from the diffractive optical modulator, and adjust voltage to be applied to the diffractive optical modulator based on measurement results.

19 Claims, 14 Drawing Sheets

| Input gray level | Corrected gray level | | | |
|---|---|---|---|---|
| | Element 1 | Element 2 | .... | Element 480 |
| 0 | 5 | 4 | | 3 |
| 1 | 6 | 5 | | 4 |
| ⋮ | ⋮ | ⋮ | .... | ⋮ |
| 254 | 249 | 248 | | 247 |
| 255 | 250 | 249 | | 248 |

FIG.19

| R light source 0 gray level data | B video data | R light source 0 gray level data | G video data | R light source 0 gray level data | B video data |

APPARATUS FOR ADJUSTING APPLIED VOLTAGE IN DISPLAY SYSTEM USING DIFFRACTIVE OPTICAL MODULATOR

CROSS REFERENCE TO RELATED APPLICATION(S)

This application claims the benefit of Korean Patent Application No. 10-2005-0102468, entitled "Reference voltage reconstruction apparatus in display system using diffraction modulation and method thereof", filed Oct. 28, 2005, and of Korean Patent Application No. 10-2005-0110806, entitled "Electrode voltage construction apparatus in display system using diffraction modulation and method thereof", filed Nov. 18, 2005, which are hereby incorporated by references in their entirety into this application.

BACKGROUND OF THE INVENTION

1. Field of the Invention

The present invention relates to an apparatus for adjusting applied voltage in a display system using a diffractive optical modulator, which can measure the intensity of diffracted light emitted from the diffractive optical modulator, and adjust voltage to be applied to the diffractive optical modulator based on measurement results.

2. Description of the Related Art

Active research into various Flat Panel Displays (FPDs) has been conducted to develop next generation display devices. Among them, generalized FPDs include Liquid Crystal Displays (LCDs) using the electro-optic characteristics of liquid crystal and Plasma Display Panels (PDPs) using gas discharge.

LCDs are disadvantageous in that the viewing angle thereof is narrow, the response speed thereof is slow, and the manufacturing process thereof is complicated because Thin Film Transistors (TFTs) and electrodes must be formed through a semiconductor manufacturing process.

In contrast, PDPs are advantageous in that the manufacturing process thereof is simple, and is therefore suitable for the implementation of a large-sized screen, but are disadvantageous in that the power consumption thereof is high, the discharge and light emission efficiency thereof is low, and the price thereof is high.

New types of display devices, which can solve the disadvantages of the above-described FPDs, have been developed. Recently, there has been proposed a display device that can display images using micro Spatial Light Modulators (SLMs) that are formed for respective pixels using Micro Electromechanical Systems (hereinafter abbreviated as "MEMSs"), which are based on an ultra-micro machining technology.

The SLMs are converters that are configured to modulate incident light into a spatial pattern corresponding to an electrical or optical input. The incident light may be modulated with respect to phase, intensity, polarization or direction. Optical modulation can be achieved using several materials that have several electro-optic or magneto-optic effects, or material that modulates light through surface deformation.

FIG. 1 is a perspective view of a conventional open hole-based diffractive optical modulator.

Referring to the drawing, the conventional open hole-based diffractive optical modulator includes a substrate 101.

The open hole-based diffractive optical modulator further includes an insulating layer 102 that is formed on the substrate 101.

The open hole-based diffractive optical modulator further includes a lower reflective part 103 that is formed on part of the insulating layer 102 and is configured to reflect incident light that passes through the holes 106aa to 106nb of upper reflective parts 106a to 106n and the spaces between the upper reflective parts 106a to 106n.

The open hole-based diffractive optical modulator further includes a pair of side support members 104 and 104' that allow the lower reflective part 103 to be interposed therebetween, and are formed on the surface of the substrate 101 and spaced apart from each other.

The open hole-based diffractive optical modulator further includes a plurality of laminate support plates 105a to 105n that have side portions supported by the pair of side support members 104 and 104', are spaced apart from the substrate 101, have central portions movable upward and downward, have holes (not shown) corresponding to the holes 106aa to 106nb formed in the upper reflective parts 106a to 106n at the central portions thereof, and constitute an array.

The open hole-based diffractive optical modulator further includes the upper reflective parts 106a to 106n that are respectively formed at the central portions of the laminate support plates 105a to 105n, have the holes 106aa to 106nb at the centers thereof, so that they reflect some incident light and allow the remaining incident light to pass through the holes 106aa to 106nb, and constitute an array.

The open hole-based diffractive optical modulator further includes a plurality of pairs of piezoelectric layers 110a to 110n and 110a' to 110n' that are formed over the laminate support plates 106a to 106n, are spaced apart from each other, are placed over the side support members 104 and 104', and are configured to move the laminate support plates 106a to 106n upward and downward.

In the piezoelectric layers 110a to 110n and 110a' to 110n', when voltage is applied to the lower or first electrode layers 110aa to 110na and 110aa' to 110na, the piezoelectric material layers 110ab to 110nb and 110ab to 110nb' and the upper or second electrode layers 110ac to 110nc and 110ac' to 110nc, the central portions of the laminate support plates 105a to 105n move upward and downward due to the contraction and expansion of the piezoelectric material layers 110ab to 110nb and 110ab' to 110nb'. Accordingly, the upper reflective parts 106a to 106n move upward and downward. For convenience of description, a unit, including each of the laminate support plates 106a to 106n, each of the upper reflective parts 106a to 106n, and each pair of the piezoelectric layers 110a to 110n and 110a' to 110n', is referred to as an element.

Meanwhile, when light is incident on the upper reflective parts 106a to 106n of the open hole-based diffractive optical modulator, the upper reflective parts 106a to 106n reflect part of the incident light and allow the remaining part of the incident light to pass through the holes 106aa to 106nb, and the lower reflective part 103 reflects light that has passed through the holes 106aa to 106nb of the upper reflective parts 106a to 106n.

As a result, the light reflected from the upper reflective parts 106a to 106n and the light reflected from the lower reflective part 103 forms diffracted light having several diffraction coefficients. The intensity of the diffracted light is highest when the difference in height between the upper reflective parts 106a to 106n and the lower reflective part 103 is an odd multiple of $\lambda/4$ (where $\lambda$ is the wavelength of the incident light), and is lowest when the difference in height between the upper reflective parts 106a to 106n and the lower reflective part 103 is an even multiple of $\lambda/4$.

FIG. 2 is a partial sectional view of the open hole-based diffractive optical modulator, which is taken along line A-A' of FIG. 1, and is a sectional view of first upper reflective parts 106a and second upper reflective parts 106b.

In FIG. 2, when the interval between the upper reflective parts 106a and 106b and the lower reflective part 103 formed on the insulating layer is a first interval $$\frac{n\lambda}{2}$$

(where λ is the wavelength of incident light and n is an integer), the intensity of light is lowest. Furthermore, when the interval between the upper reflective parts 106a and 106b and the lower reflective part 103 formed on the insulating layer is a second interval $$\frac{\lambda}{4} + \frac{n\lambda}{2},$$

the intensity of light is highest. Meanwhile, in order to exhibit the highest intensity of light, the first upper reflective parts 106a, indicated by solid lines, must be displaced by $l_1$ or $L_1$, and the second upper reflective parts 106b must be displaced by $l_2$ or $L_2$.

However, there may be a case where the upper reflective parts 106a and 106b are located at locations indicated by the dotted lines, not the initial locations indicated by the solid lines, even when voltage is not applied to the piezoelectric layers 110a, 110a', 110b and 110b', due to frequent upward and downward movements over time. In this case, in order to obtain the lowest intensity of light or the highest intensity of light, the first upper reflective parts 106a and 106b must be displaced by $l_1'$ or $L_1'$, and the second upper reflective parts 106b and 106b' must be displaced by $l_2'$ or $L_2'$.

In conclusion, the amount of displacement of the upper reflective parts 106a to 106n for displaying the lowest intensity of light or the highest intensity of light varies. If voltage is applied without considering the variation in the amount of displacement, the intensity of diffracted light, which is expected to be obtained according to the applied voltage, cannot be obtained, thus resulting in the degradation of picture quality characteristics.

Accordingly, the issues that should be considered in the various applications of the above diffractive optical modulator are that there is a possibility that the relationship between an initially set reference applied voltage and the intensity of light may not be maintained any longer when the material/mechanical deformation of the diffractive optical modulator occurs during the operation thereof, and that voltage must be applied in consideration of the variation in the amount of displacement.

SUMMARY OF THE INVENTION

Accordingly, the present invention has been made keeping in mind the above problems occurring in the prior art, and an object of the present invention is to provide an apparatus for adjusting applied voltage in a display system using a diffiactive optical modulator, which can adjust the voltage that will be applied to the diffractive optical modulator, based on the measured intensity of diffracted light emitted from the diffractive optical modulator.

In order to accomplish the above object, the present invention provides an apparatus for adjusting applied voltage in a display system, the apparatus having an optical source system, an illumination optical unit, a diffractive optical modulator, a projection and scanning optical unit and a screen, the diffractive optical modulator having a first reflective part and a second reflective part spaced apart from the first reflective part by a specific distance, generating diffracted light using light reflected from the first and second reflective parts, and varying the specific distance between the first and second reflective parts using a piezoelectric layer made of piezoelectric material, the apparatus including a light intensity detection unit for measuring an intensity of diffracted light output when the applied voltage is applied to the piezoelectric layer of the diffractive optical modulator, and outputting the measured intensity of the diffracted light; and an applied voltage adjustment unit for applying the applied voltage to the piezoelectric layer of the diffractive optical modulator, receiving the intensity of the diffracted light, which is output from the diffractive optical modulator, from the light intensity detection unit, comparing the received intensity of diffracted light with the expected intensity of light, which is expected to be measured when the applied voltage is applied to the piezoelectric layer of the diffractive optical modulator, and adjusting the applied voltage that must be used in order to obtain a specific light intensity from the diffractive optical modulator.

BRIEF DESCRIPTION OF THE DRAWINGS

The above and other objects, features and advantages of the present invention will be more clearly understood from the following detailed description taken in conjunction with the accompanying drawings, in which:

FIG. 19 is a timing diagram for video gray level data that are output from the video correction and control unit of FIGS. 4A and 4B.

DESCRIPTION OF THE PREFERRED EMBODIMENTS

The present invention will now be described in detail in conjunction with preferred embodiments with reference to the accompanying drawings.

Figure 3:
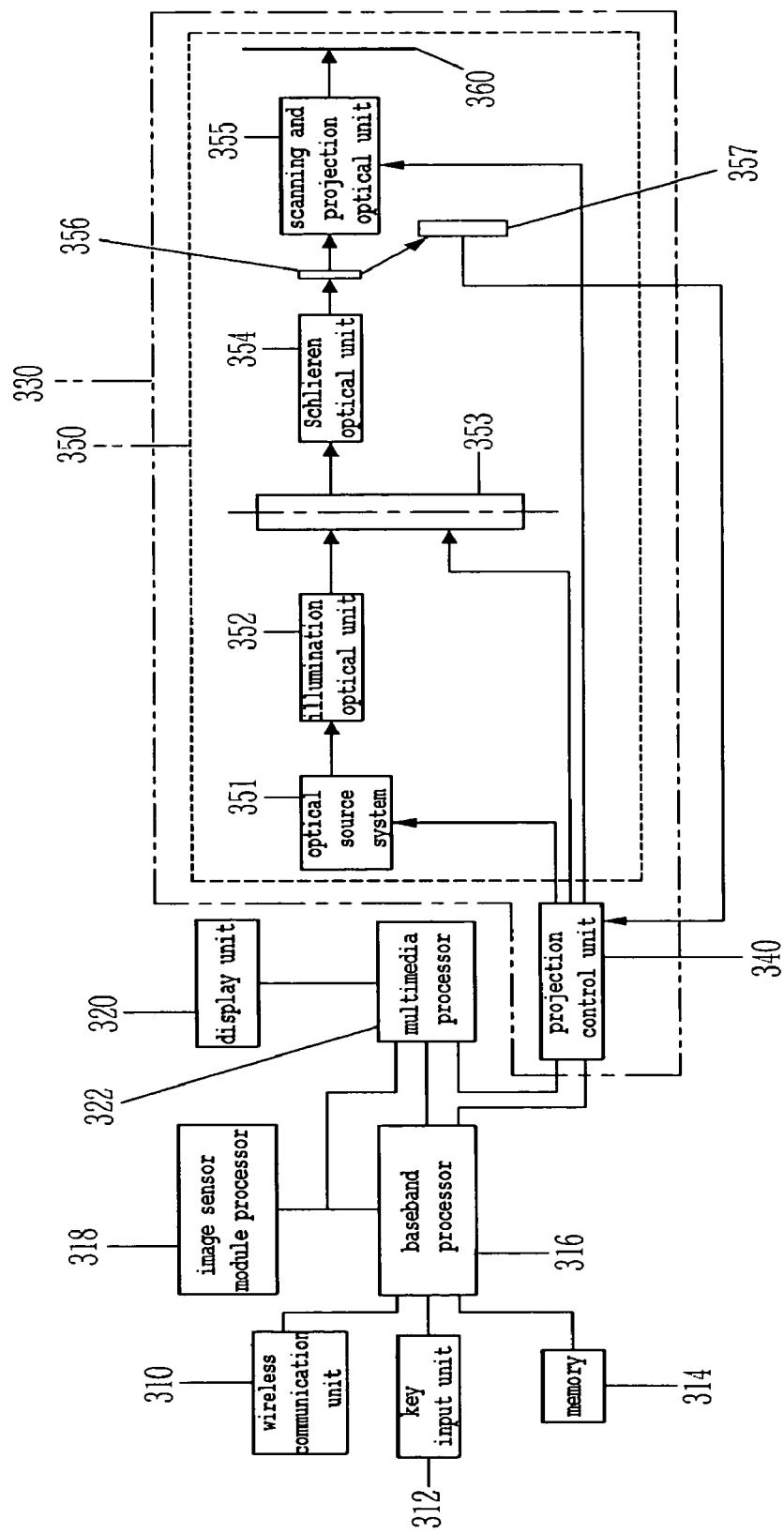
FIG. 3 is a block diagram of a display system using a diffractive optical modulator, which is applied to a portable terminal that is equipped with an apparatus for adjusting applied voltage according to an embodiment of the present invention.

FIG. 3 is a block diagram of a display system using a diffractive optical modulator, which is applied to a portable terminal that is equipped with an apparatus for adjusting applied voltage according to an embodiment of the present invention.

As shown in FIG. 3, the display system using a diffractive optical modulator, which is applied to a portable terminal that is equipped with the apparatus for adjusting applied voltage according to an embodiment of the present invention, includes a wireless communication unit 310 for performing wireless communication, a key input unit 312 for allowing a user to input information, memory 314 for storing video data, etc., a baseband processor 316 for performing control so that video images are displayed on a display unit 320 or the projection control unit 340 of an optical modulator projector 330 (that is, a display system using a single panel-type diffractive optical modulator) projects video images onto a screen 360, an image sensor module processor 318 for processing video input from a provided camera or the like and sending the processed video data to the baseband processor 316, the display unit 120 for receiving video data from the baseband processor 316 and displaying video on a screen based on the received video data, and the single panel-type optical modulator projector 330 for, under the control of the baseband processor 316, generating a video image based on the video data, received from the baseband processor 316, using the single panel diffractive optical modulator, enlarging the generated video image, and projecting the enlarged video image onto the screen 360. In this case, the baseband processor 316 may be referred to as a "terminal control system."

In this case, the optical modulator projector 330 includes a projection control unit 340 for performing control so that the optical modulation system 350 generates video based on the video data received from the baseband processor 31 according to a control signal from the baseband processor 316, and an optical modulation system 350 for generating a video image according to the control signal from the projection control unit 340, and enlarging the generated video image and projecting the enlarged video image onto the screen 360.

Figure 4A:
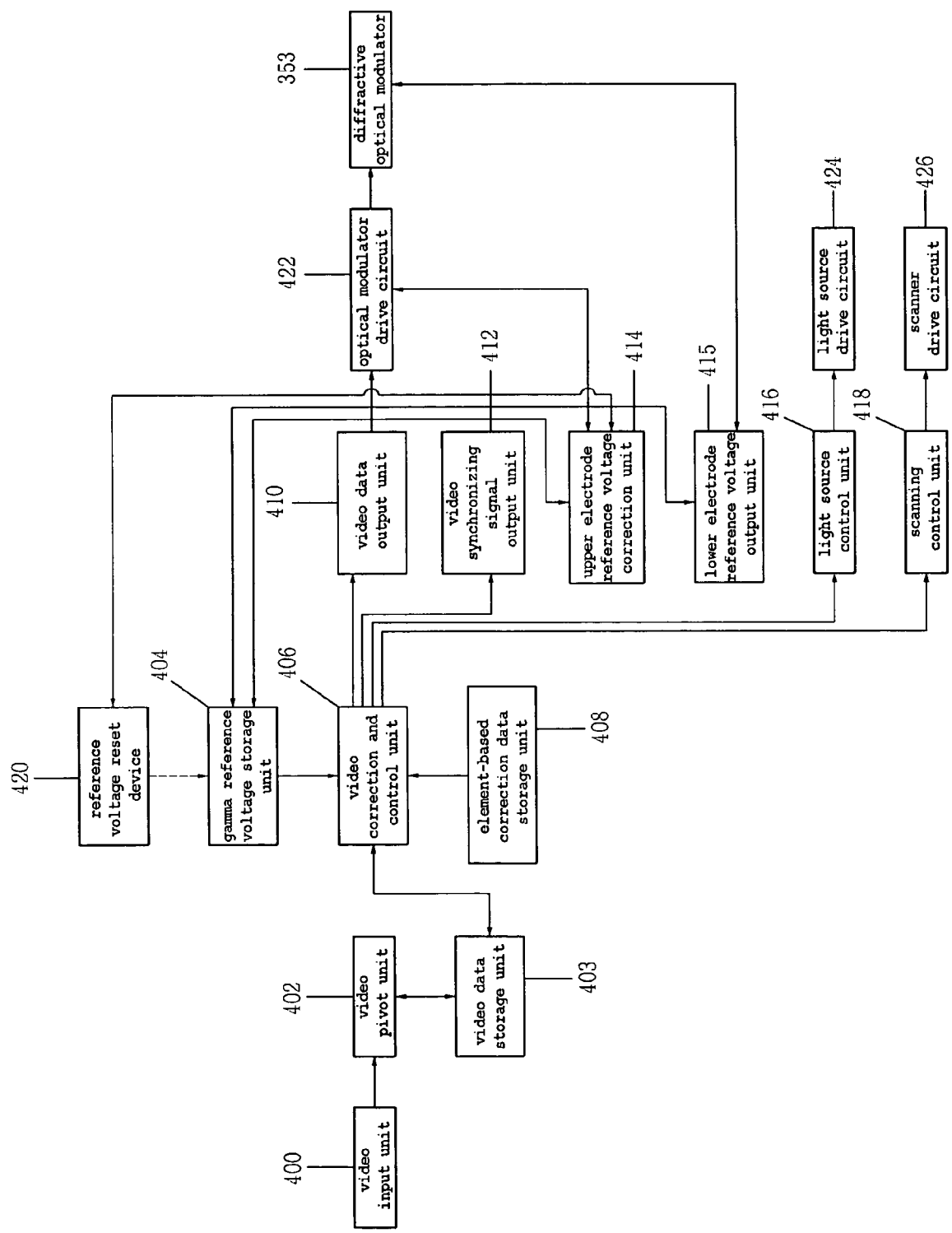
FIG. 4A is a block diagram of the projection control unit of FIG. 3 according to an embodiment of the present invention.

An example of the projection control unit 340, as illustrated in FIG. 4A, includes a video input unit 400, a video pivot unit 402, a video data storage unit 403, a gamma reference voltage storage unit 404, a video correction and control unit 406, an element-based correction data storage unit 408, a video data output unit 410, a video synchronizing signal output unit 412, an upper electrode reference voltage correction unit 414, a lower electrode reference voltage output unit 415, a light source control unit 416, a scanning control unit 418, a reference voltage reset device 420, an optical modulator drive circuit 422, a light source drive circuit 424, and a scanner drive circuit 426.

Figure 4B:
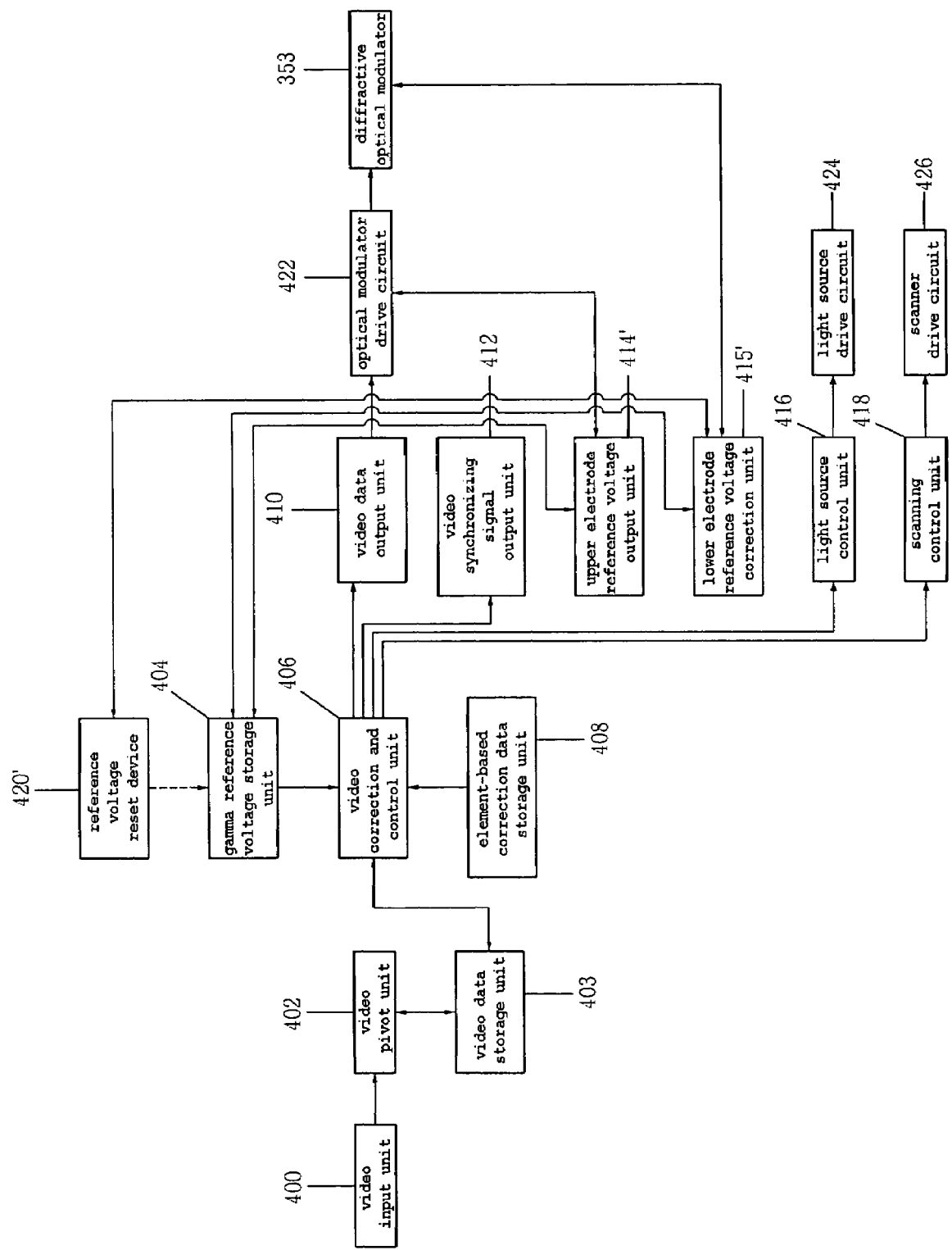
FIG. 4B is a block diagram of the projection control unit of FIG. 3 according to another embodiment of the present invention.

Another example of the projection control unit 340, as illustrated in FIG. 4B, includes a video input unit 400, a video pivot unit 402, a video data storage unit 403, a gamma reference voltage storage unit 404, a video correction and control unit 406, an element-based correction data storage unit 408, a video data output unit 410, a video synchronizing signal output unit 412, an upper electrode reference voltage output unit 414', a lower electrode reference voltage correction unit 415', a light source control unit 416, a scanning control unit 418, a reference voltage reset device 420', an optical modulator drive circuit 422, a light source drive circuit 424, and a scanner drive circuit 426.

Here, the video input unit 400 and the video pivot unit 402 interface the optical modulation system 350 and the terminal control system with each other.

The optical modulation system 350 includes an optical source system 351 for generating and emitting RGB light, an illumination optical unit 352 for causing the light, emitted from the optical source system 352, to enter a diffractive optical modulator 353, the diffractive optical modulator 353 for generating a video image by diffracting the light incident from the illumination optical unit 352 (That is, the illumination optical unit 352 generates diffracted light having a plurality of diffraction orders by diffracting incident light. In this case, the video image is generated using diffracted light having one or more diffraction orders, which belongs to the diffracted light having the plurality of diffraction orders), a Schlieren optical unit 354 for passing only diffracted light having a desired order, which is selected from the diffracted light having the plurality of diffraction orders that is generated by the diffractive optical modulator 353, therethrough, a scanning and projection optical unit 355 for projecting a video image, which is composed of the diffracted light passing through the Schlieren optical unit 354, onto the screen 360, a semi-transmissive reflective unit 356 located behind the Schlieren optical unit 354 and configured to pass most of the diffracted light, passed through the Schlieren optical unit 354, therethrough to the projection and scanning optical unit 355 and to pass the remaining part of the diffracted light therethrough to a light intensity detection unit 357, and the light intensity detection unit 357 for measuring and outputting the intensity of diffracted light reflected and incident from the semi-transmissive reflective unit 356.

The projection operation of a portable terminal using an optical modulation projector will be described in brief with reference to FIGS. 3, 4A, and 4B below.

When a user selects a projection mode for enlarging a video image and projecting the enlarged image onto the screen using the key input unit 312 (the projection mode is provided to the user through a menu) and then selects a video image to be projected onto the screen 360, the baseband processor 316 sends video data, which corresponds to the video image selected by the user, to the projection control unit 340.

The baseband processor 316 sends a projection mode control signal to the projection control unit 340, so that the projection control unit 340 transmits a driving signal based on the received video data to the optical source system 351 and the diffractive optical modulator 353.

That is, the video input unit 400 of the projection control unit 340 receives a vertical synchronizing signal Vsync and a horizontal synchronizing signal Hsync at the same time that it receives the video data from the baseband processor 316.

The video pivot unit 402 of the projection control unit 340 performs a data transposition of converting laterally arranged video data into vertically arranged data, thereby converting laterally input video data into vertically arranged video data and outputting the data. The reason why data transposition is required in the video pivot unit 402 is that scan lines emitted from the diffractive optical modulator 353 are laterally scanned and displayed because scanning diffraction point light beams corresponding to a plurality of pixels (for example, 480 pixels when input video data is 480×640) are vertically arranged.

Figure 1:
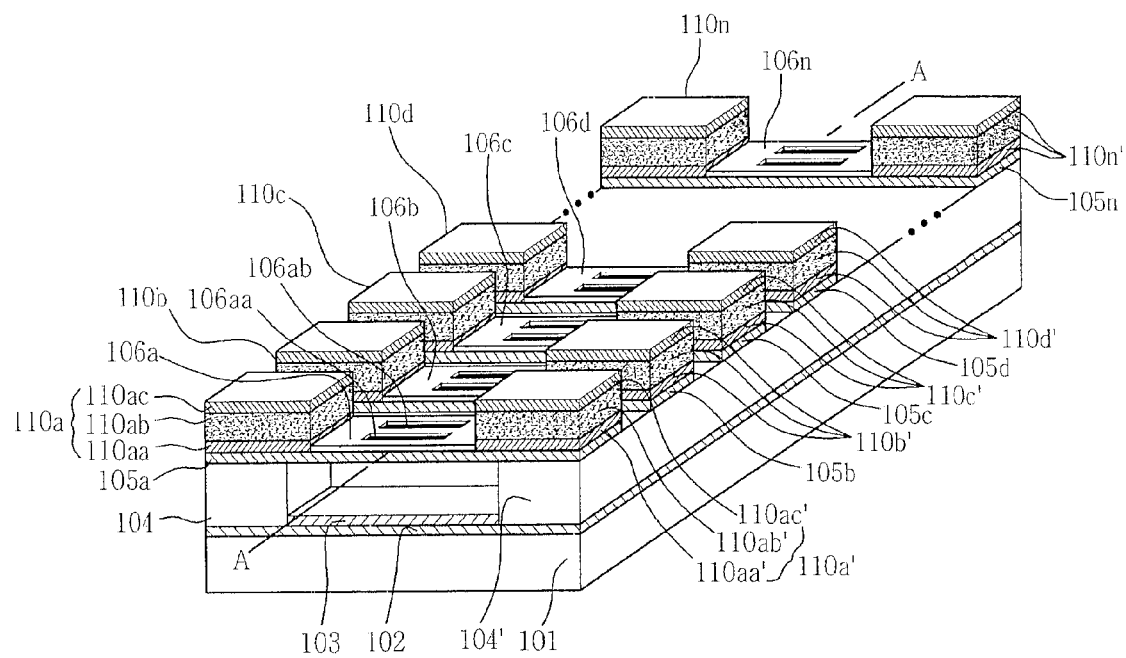
FIG. 1 is a perspective view of a conventional open hole-based diffractive optical modulator.
Figure 2:
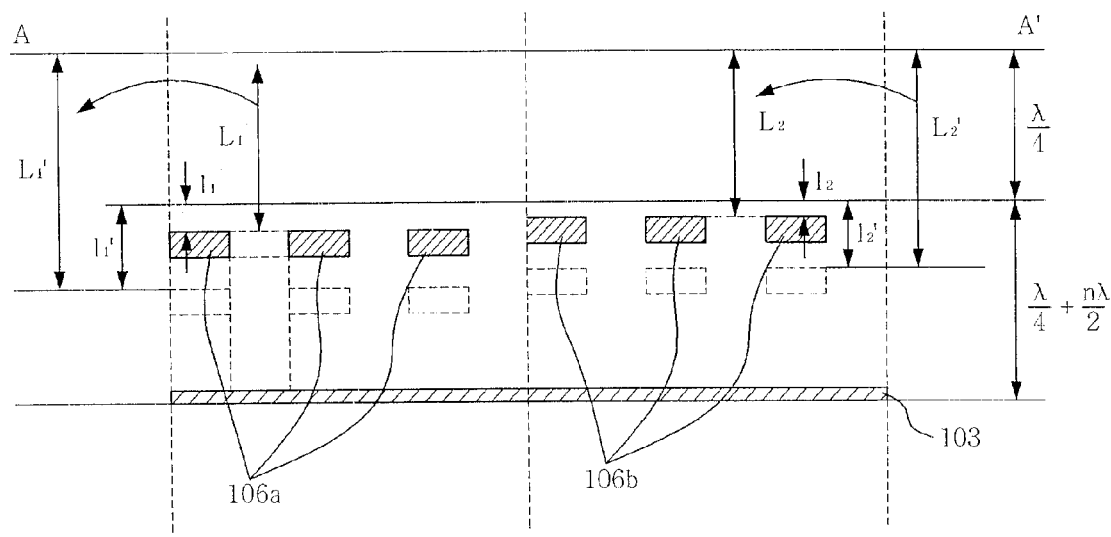
FIG. 2 is a partial sectional view of the open hole-based diffractive optical modulator, which is taken along line A-A' of FIG. 1 and shows a sectional view of first upper reflective parts and second upper reflective parts.
Figure 5A:
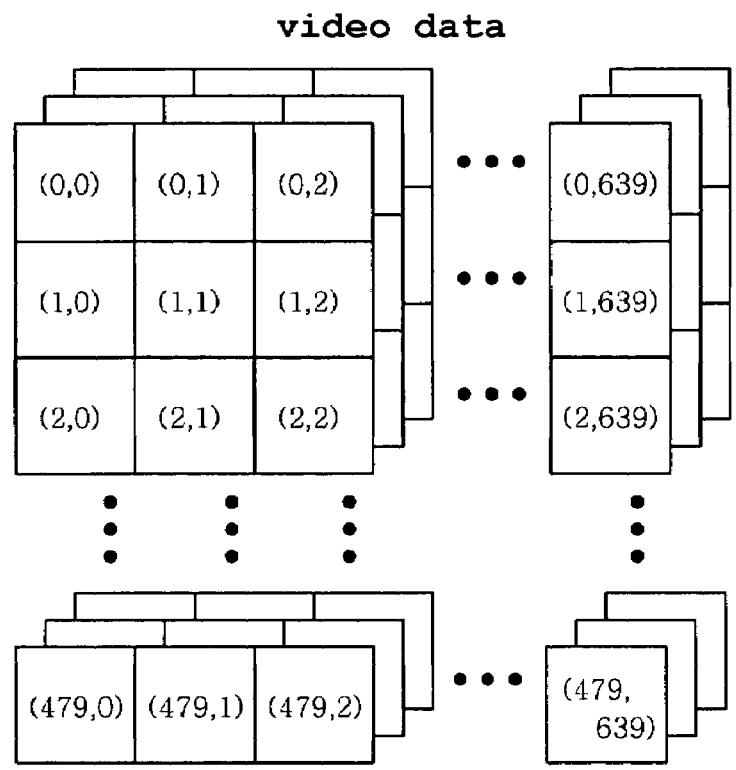
FIG. 5A is a view showing the structure of a frame of video data composed of 480×640 pixels.

That is, as shown in FIG. 5A, standard video data is arranged in a lateral direction. However, since the diffractive optical modulator 353, as shown in FIG. 1, has a plurality of upper reflective parts arranged in a vertical direction, the diffractive optical modulator 353 displays a plurality of pieces of video data while scanning the video data in a lateral direction.

Accordingly, in order to form one frame of video, composed of 480×640 pixels, using the diffractive optical modulator 353 by scanning scan lines, 480 pieces of vertically arranged data are required.

FIG. 5A illustrates the structure of a frame of video data that is composed of 480×640 pixels. The video data shown in FIG. 5A is input from the outside in a lateral direction in the sequence of (0,0), (0,1), (0,2), (0,3), . . . .

Figure 5B:
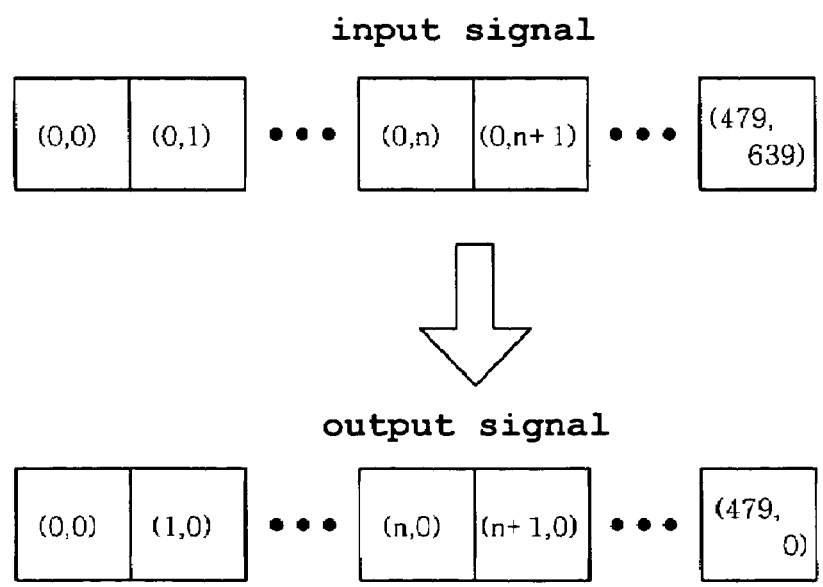
FIG. 5B is a view showing the transposition of input video data from laterally arranged data to vertically arranged data.

However, since 480 pieces of vertically arranged data are required to generate a single frame of video data using the diffractive optical modulator 353, the input video data, as shown in FIG. 5B, must be transposed from laterally arranged video data to vertically arranged video data.

During scanning, the video correction and control unit 406 sequentially reads the video data, which is transposed by the video pivot unit 402 and stored in the video data storage unit 403, from the first column to the last column, and outputs the read video data.

When the video data is input from the video pivot unit 402, the video correction and control unit 406 performs correction based on an element-based correction data table stored in the element-based correction data storage unit 408 and outputs corrected video data to the video data output unit 410.

The gamma reference voltage storage unit 404 stores an upper or second electrode (gamma) reference voltage and a lower or first electrode (gamma) reference voltage therein.

In this case, the term "upper or second electrode (gamma) reference voltage" stored in the gamma reference voltage storage unit 404 refers to an upper or second electrode reference voltage that is considered when the optical modulator drive circuit 422 of the diffractive optical modulator 353 outputs an applied voltage based on the gray level of video data for respective elements.

The term "lower or first electrode (gamma) reference voltage" stored in the gamma reference voltage storage unit 404 refers to a lower or first electrode reference voltage that is applied to the lower electrode layer of the diffractive optical modulator 353.

Figure 6:
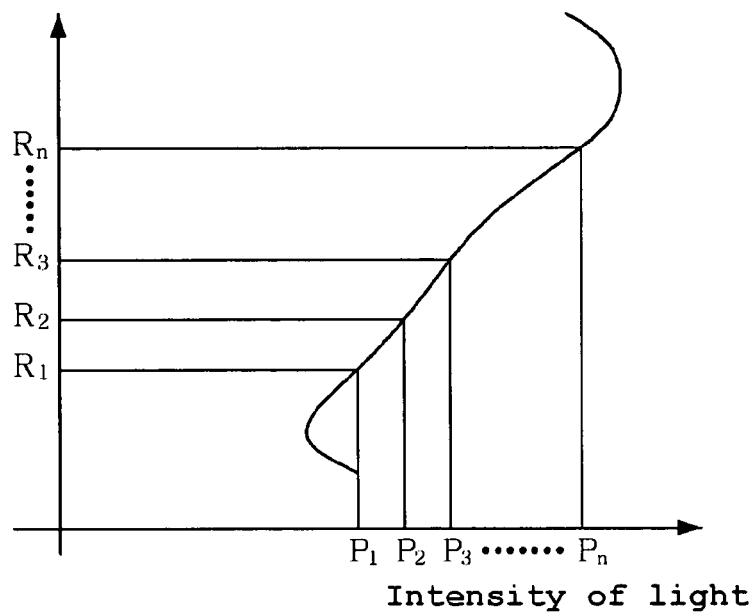
FIG. 6 is a graph showing the intensity of diffracted light versus applied voltage in the diffractive optical modulator.

The reason why the upper or second electrode reference voltage needs to be stored in the gamma reference voltage storage unit 404 and to be considered by the optical modulator drive circuit 422 of the diffractive optical modulator 353 when the optical modulator drive circuit 422 outputs an applied voltage based on the gray level is that the intensity of diffracted light emitted from the diffractive optical modulator 353 has a gamma characteristic in which the intensity of diffracted light is not changed linearly according to the voltage level of the applied voltage but is changed nonlinearly, as illustrated in FIG. 6. That is, referring to the light intensity history curve of FIG. 6, the intensity of light to be obtained is linearly changed, that is, light intensities $P_1$, $P_2, \ldots, P_n$ have a uniform interval, whereas applied voltages $R_1, R_2, \ldots, R_n$ do not have a uniform interval, but exhibit non-linearity. Therefore, the upper or second electrode reference voltage needs to be stored in the gamma reference voltage storage unit 404 and to be considered by the optical modulator drive circuit 422 of the diffractive optical modulator 353 when the optical modulator drive circuit 422 outputs an applied voltage based on a gray level.

The upper electrode reference voltage stored in the gamma reference voltage storage unit 404 is determined for each optical source. For example, R upper electrode reference voltages $R_1$ to $R_n$ are determined for the R light source, G upper electrode reference voltages $G_1$ to G are determined for the G light source, and B upper electrode reference voltages $B_1$ to $B_n$ are determined for the B light source.

The lower or first electrode reference voltage stored in the gamma reference voltage storage unit 404 is determined for each optical source. For example, an R upper electrode reference voltage $R_L$ is determined for the R light source, a G upper electrode reference voltage $G_L$ is determined for the G light source, and a B upper electrode reference voltage $B_L$ is determined for the B light source.

Referring to FIG. 4A related to an embodiment of the present invention, when the video data is input from the video data output unit 410, the optical modulator drive circuit 422 considers the upper or second electrode reference voltage output from the upper electrode reference voltage correction unit 414 in order to obtain an upper or second electrode voltage that matches the video data. At this time, the upper or second electrode reference voltage correction unit 414 reads the upper or second electrode reference voltage stored in the gamma reference voltage storage unit 404, corrects the read upper or second electrode reference voltage, and outputs the corrected upper electrode reference voltage to the optical modulator drive circuit 422. The reason why the upper or second electrode reference voltage correction unit 414 corrects the upper or second electrode reference voltage will be described in detail below.

The lower or first electrode reference voltage stored in the gamma reference voltage storage unit 404 is applied to the lower or first electrode layer of the diffractive optical modulator 353. At this time, the lower or first electrode reference voltage output unit 415 reads the lower or first electrode reference voltage stored in the gamma reference voltage storage unit 404 and outputs the read lower or first electrode reference voltage to the lower or first electrode layer of the diffractive optical modulator 353. By doing this, the driving voltage (applied voltage) for each of the elements of the diffractive optical modulator 353 is set at the difference between the upper electrode voltage output from the optical modulator drive circuit 422 and the lower or first electrode voltage applied to the lower or first electrode layer from the lower or first electrode reference voltage output unit 415.

Meanwhile, referring to FIG. 4B related to another embodiment of the present invention, when a gray level is input from the video data output unit 410 as the video data, the optical modulator drive circuit 422 considers the upper electrode reference voltage output from the upper electrode reference voltage output unit 414' in order to obtain an upper electrode reference voltage that matches the gray level. At this time, the upper electrode reference voltage output unit 414' reads the upper electrode reference voltage stored in the gamma reference voltage storage unit 404, and outputs the read upper electrode reference voltage to the optical modulator drive circuit 422.

The lower electrode reference voltage correction unit 415' reads the lower electrode reference voltage stored in the gamma reference voltage storage unit 404, corrects the read lower electrode reference voltage based on a correction value, and outputs the corrected lower electrode reference voltage to the lower electrode layer of the diffractive optical modulator 353. In this case, the reason why the lower electrode reference voltage correction unit 415' corrects the lower electrode reference voltage will be described in detail below. By doing this, the driving voltage (applied voltage) for each of the elements of the diffractive optical modulator 353 is set at the difference between the upper electrode voltage output from the optical modulator drive circuit 422 and the lower electrode voltage applied to the lower electrode layer from the lower electrode reference voltage correction unit 415'.

Figure 7:
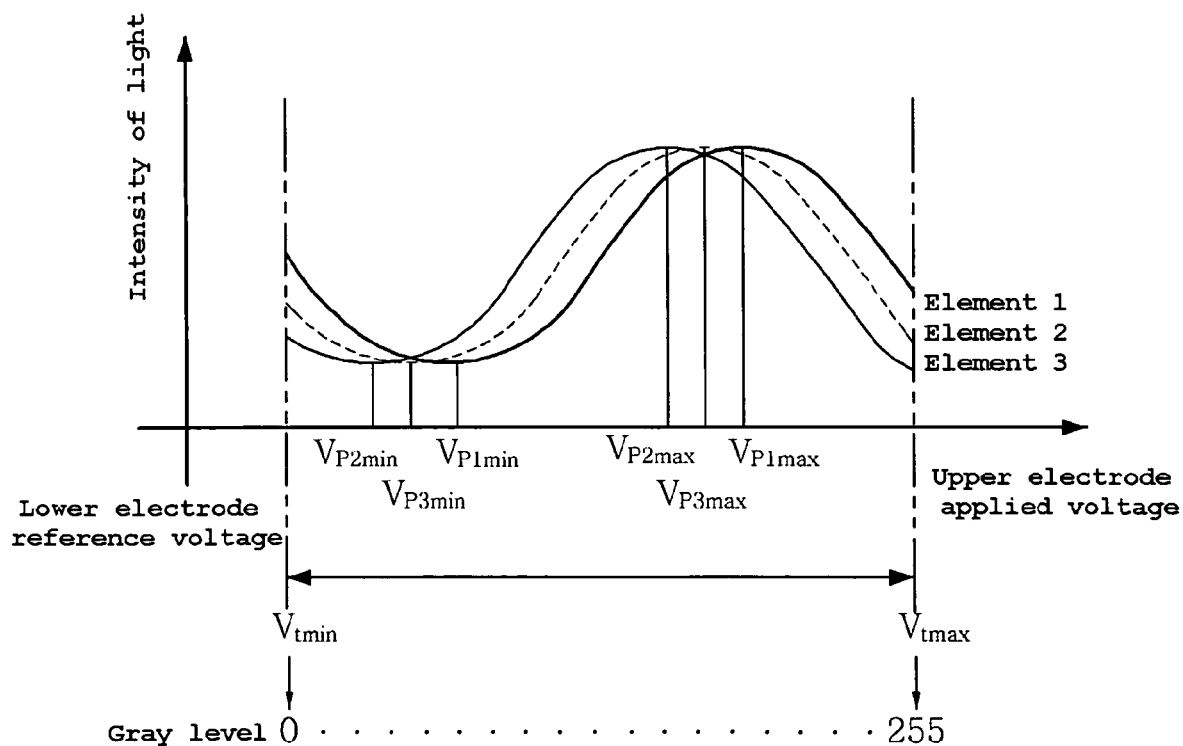
FIG. 7 is a graph showing the voltage applied to each element of the diffractive optical modulator versus the intensity of light.

Meanwhile, the upper electrode reference voltage and the lower electrode reference voltage are obtained by obtaining the intensity of light for respective elements using a light intensity detector (for example, a photosensor) after the diffractive optical modulator 353 is repeatedly driven within a voltage range when the diffractive optical modulator 353 is fabricated, and constructing a light intensity history curve for respective elements, as illustrated in FIG. 6. Examples of light intensity history curves for three different elements, which are obtained at that time, are illustrated in FIG. 7. In the drawing, for element 1, the voltage having the lowest light intensity is $V_{P1min}$ and the voltage having the highest light intensity is $V_{P1max}$, for element 2, the voltage having the lowest light intensity is $V_{P2min}$ and the voltage having the highest light intensity is $V_{P2max}$, and for element 3, the voltage having the lowest light intensity is $V_{P3min}$ and the voltage having the highest light intensity is $V_{P3max}$.

When a tester inputs the selected upper electrode reference voltage to the gamma reference voltage storage unit 404 as described above, the input upper electrode reference voltage is stored in the gamma reference voltage storage unit 404. The tester determines the lower electrode reference voltage (that is, a reference for the upper electrode reference voltage range), and stores the determined lower electrode reference voltage in the gamma reference voltage storage unit 404. At this time, the tester provides the reference voltage reset device 420 or 420' with an average light intensity curve (as illustrated in FIG. 8), in which light intensity curves are averaged for all the upper reflective parts, so that the reference voltage reset device 420 or 420' can use the average light intensity to reset the reference voltage.

Meanwhile, the element-based correction data stored in the element-based correction data calculation unit 408 is considered by the video correction and control unit 406 in order to correct the video data input from the video pivot unit 402 and generate corrected output video data. The element-based correction data may be listed in a table, as illustrated in FIG. 9.

Figures 8, 9:
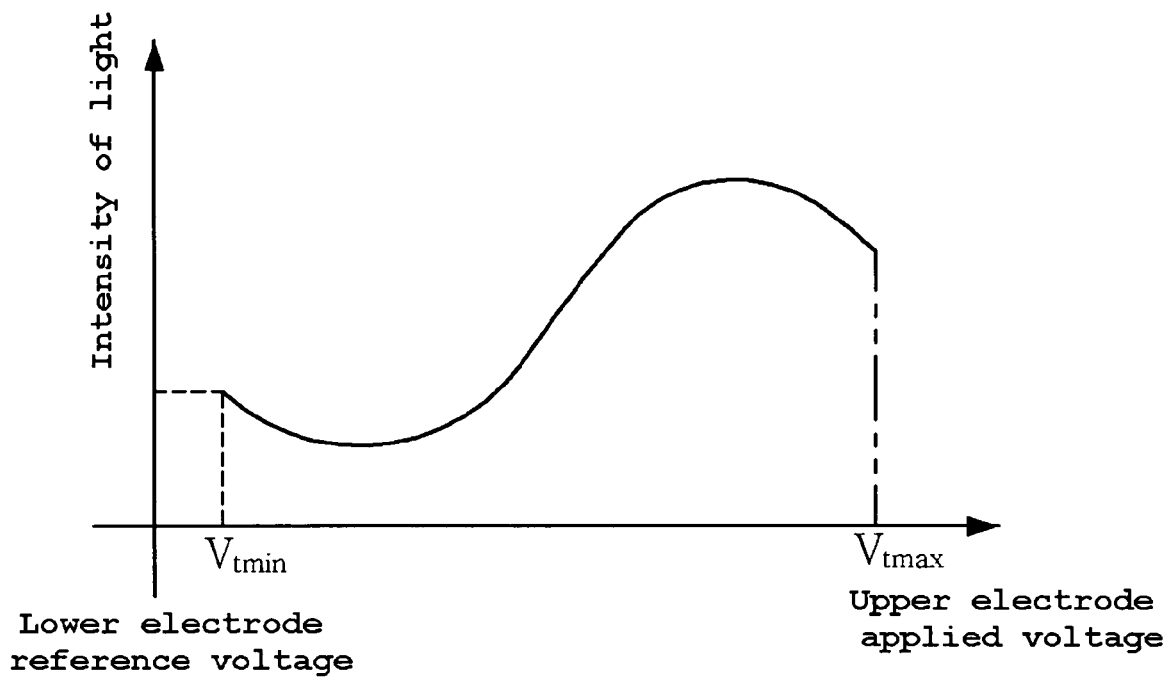
FIG. 8 is a graph showing the voltage applied to the diffractive optical modulator versus the average intensity of light.
FIG. 9 is a correction table stored in an element-based correction data storage unit.

From the correction data table of FIG. 9, it can be seen that there are externally input video gray levels (input video data), and that corrected video gray levels (corrected output video data) are determined for the externally input video gray levels for respective elements.

For example, in the case of element 1, a corrected video gray level of 5 is output when an input video gray level is 0, a corrected video gray level of 6 is output when an input video gray level is 1, a corrected video gray level of 249 is output when an input video gray level is 254, and a corrected video gray level of 250 is output when an input video gray level is 255. In order to know the reason why the element-based correction data is required, it is necessary to understand the calculation process. To understand the calculation process, it is necessary to understand the operation of the optical modulator drive circuit 422 in the display applications of the diffractive optical modulator 353.

When the gray level is input, the optical modulator drive circuit 422 determines an upper electrode voltage with reference to the upper electrode reference voltage output from the upper electrode reference voltage correction unit 414 or the upper electrode reference voltage output unit 414'.

Figure 10:
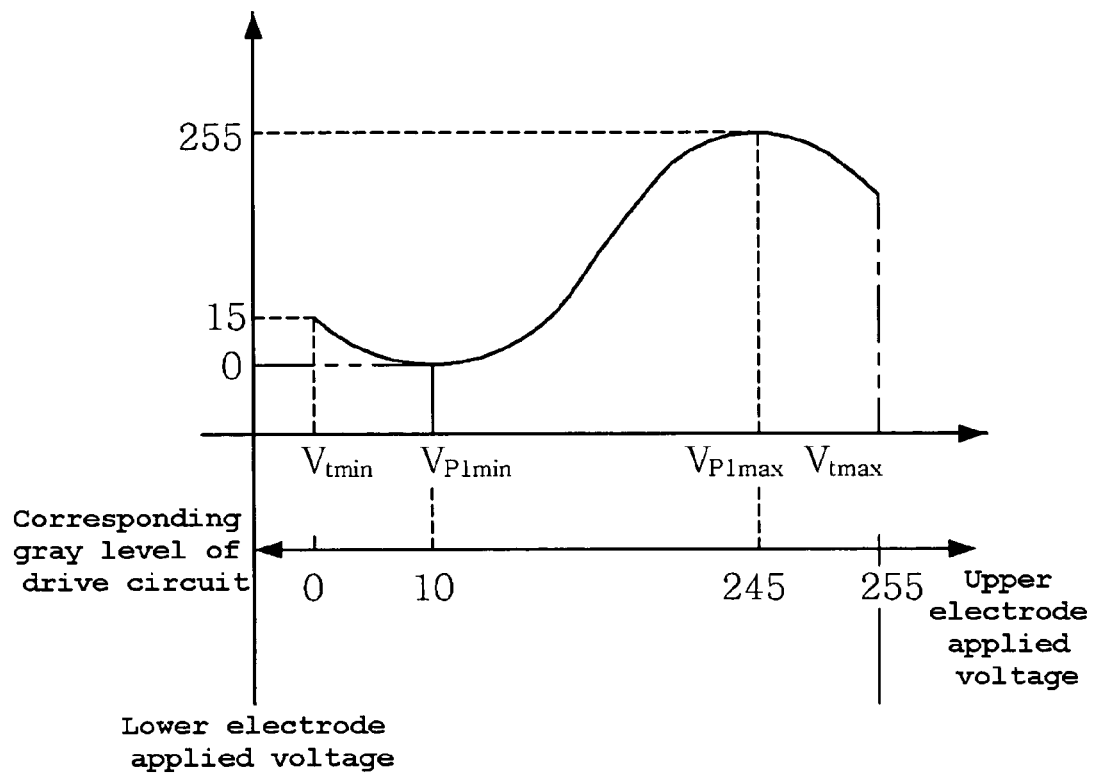
FIG. 10 is a graph illustrating an element-based correction data calculation process.

For example, assuming that the upper electrode reference voltages are $R_1$ to $R_n$ for the R light source, the optical modulator drive circuit 422 outputs driving voltage $R_1$ when a gray level of 0 is input, driving voltage $R_n$ when a gray level of 255 is input, and a preset driving voltage when a gray level between 0 and 255 is input. Meanwhile, as seen from FIG. 7, the upper electrode reference voltages are not set to the lowest voltage and the highest voltage for each element, but are set such that they include both the lowest voltage and the highest voltage. Accordingly, it is necessary to calculate the element-based correction data in reverse. This is described only for element 1 below with reference to FIG. 10, which illustrates a light intensity history curve. When 0 is applied to the optical modulator drive circuit 422 without being corrected in the case where an externally input gray level is, for example, 0, an output voltage is $R_1$ and, at this time, the intensity of light actually output by element 1 is 15. Accordingly, in order to solve such mismatch, a gray level of 10 corresponding to $V_{P1min}$, at which element 1 actually emits an intensity of light of 0, can be output to the optical modulator drive circuit 422.

In conclusion, the element-based correction data storage unit 408 stores corrected video gray levels that are listed in the table as illustrated in FIG. 9, and can correct input video gray levels input from the outside through the above-described method.

Meanwhile, the video correction and control unit 406 outputs the vertical synchronizing signal and the horizontal synchronizing signal, received from the video pivot unit 402, to the video synchronizing signal output unit 425.

The video correction and control unit 406 outputs a light source switching control signal to the light source control unit 416, thus the light source control unit 416 performs control so that the light source drive circuit 424 switches the light sources, and outputs a scanning control signal to the scanning control unit 418, thus the scanning control unit 418 drives the scanner drive circuit 426.

Then, the optical modulator drive circuit 422 receives the video data (gray level) from the video data output unit 410, determines the driving voltage with reference to the upper electrode reference voltage output from the upper electrode reference voltage correction unit 414 or the upper electrode reference voltage output unit 414', and outputs the determined driving voltage to the diffractive optical modulator 353.

Meanwhile, the reference voltage reset device 420 according to an embodiment of the present invention resets an upper electrode reference voltage correction value stored in the upper electrode reference voltage correction unit 414 of FIG. 4A.

In this case, the reason why it is necessary to reset the upper electrode reference voltage correction value is that the dynamic characteristics of the elements of the diffractive optical modulator 353 change over time. Accordingly, the reference voltage reset device 420 supplies a uniform gray level (for example, 0 or 255) to all of the elements of the diffractive optical modulator 353, detects the degree of variation in the light intensity curve by measuring the intensity of light based on the gray level, and resets the correction value so that the upper electrode reference voltage can be corrected to reflect the variation in the light intensity curve. Although the reference voltage reset device 420 is configured to reset the correction value stored in the upper electrode reference voltage correction unit 414, the reference voltage reset device 420 may be configured to reset the upper electrode reference voltage stored in the gamma reference voltage storage unit 404.

Meanwhile, the reference voltage reset device 420' according to another embodiment of the present invention resets a lower electrode reference voltage correction value stored in the lower electrode reference voltage correction unit 415' of FIG. 4B.

In this case, the reason why it is necessary to reset the lower electrode reference voltage correction value is that the dynamic characteristics of elements of the diffractive optical modulator 353 change over time. Accordingly, the reference voltage reset device 420' supplies a uniform gray level (for example, 0 or 255) to all of the elements of the diffractive optical modulator 353, detects the degree of variation in the light intensity curve by measuring the intensity of light based on the gray level, and resets a correction value so that the lower electrode reference voltage can be corrected to reflect the variation in the light intensity curve. Although the reference voltage reset device 420' is configured to reset the correction value stored in the lower electrode reference voltage correction unit 415', the reference voltage reset device 420' may be configured to reset the lower electrode reference voltage stored in the gamma reference voltage storage unit 404.

Figure 11:
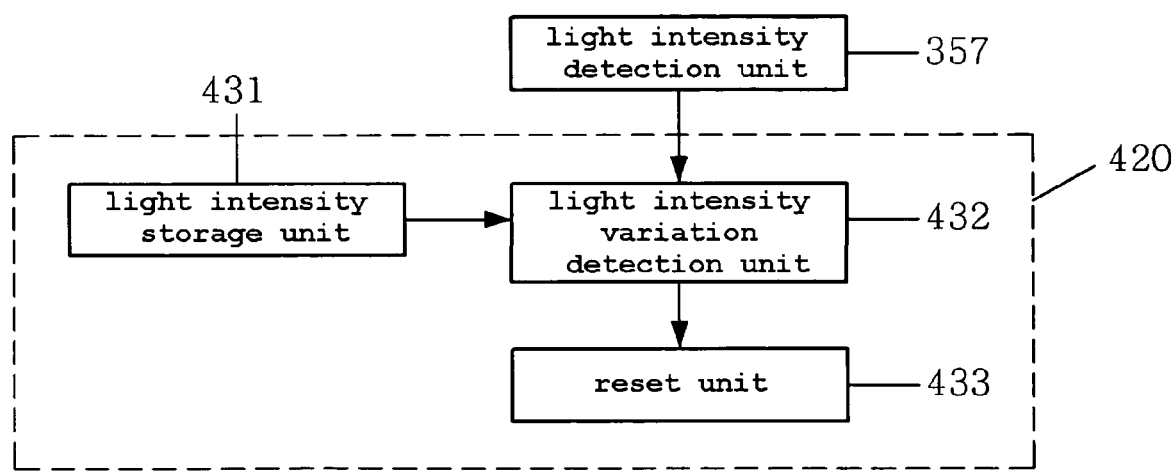
FIG. 11 is an internal block diagram of an apparatus for adjusting applied voltage according to an embodiment of the present invention.
Figure 12:
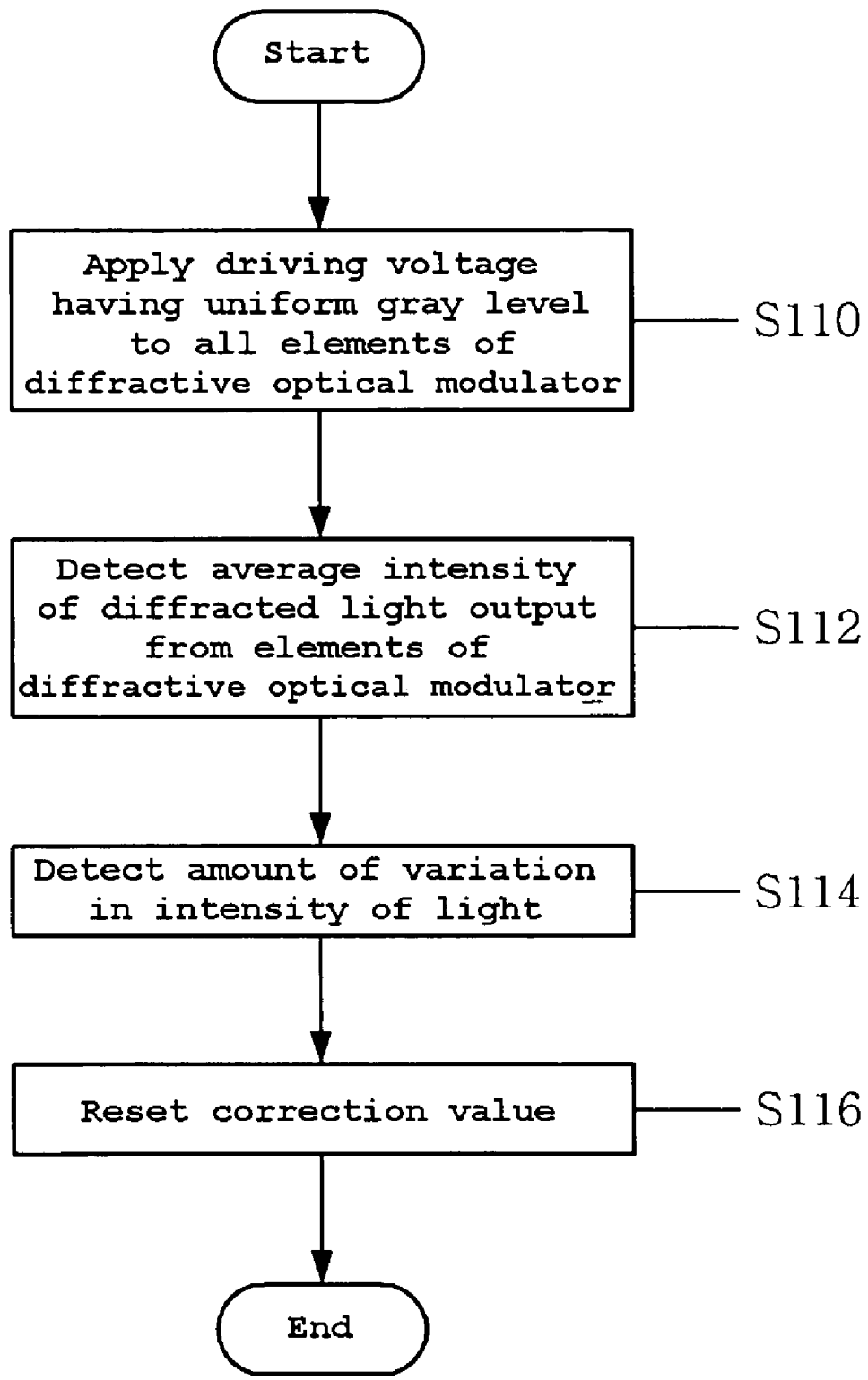
FIG. 12 is a flowchart illustrating a method of adjusting applied voltage according to an embodiment of the present invention.

FIG. 11 is an internal block diagram of the apparatus for adjusting applied voltage according to an embodiment of the present invention. FIG. 12 is a flowchart illustrating a method of adjusting applied voltage according to an embodiment of the present invention.

Referring to the drawings, the apparatus for adjusting applied voltage according to an embodiment of the present invention includes the light intensity detection unit 357 and the reference voltage reset device 420. The reference voltage reset device 420 includes a light intensity storage unit 431, a light intensity variation detection unit 432 and a reset unit 433.

A photosensor or the like may be used as the light intensity detection unit 357. When a driving voltage having a uniform gray level is applied to all of the elements of the diffractive optical modulator at step S110, the light intensity detection unit 357 detects the average intensity of diffracted light output from all of the elements of the diffractive optical modulator, and outputs the average intensity of light at step S112.

Figure 13:
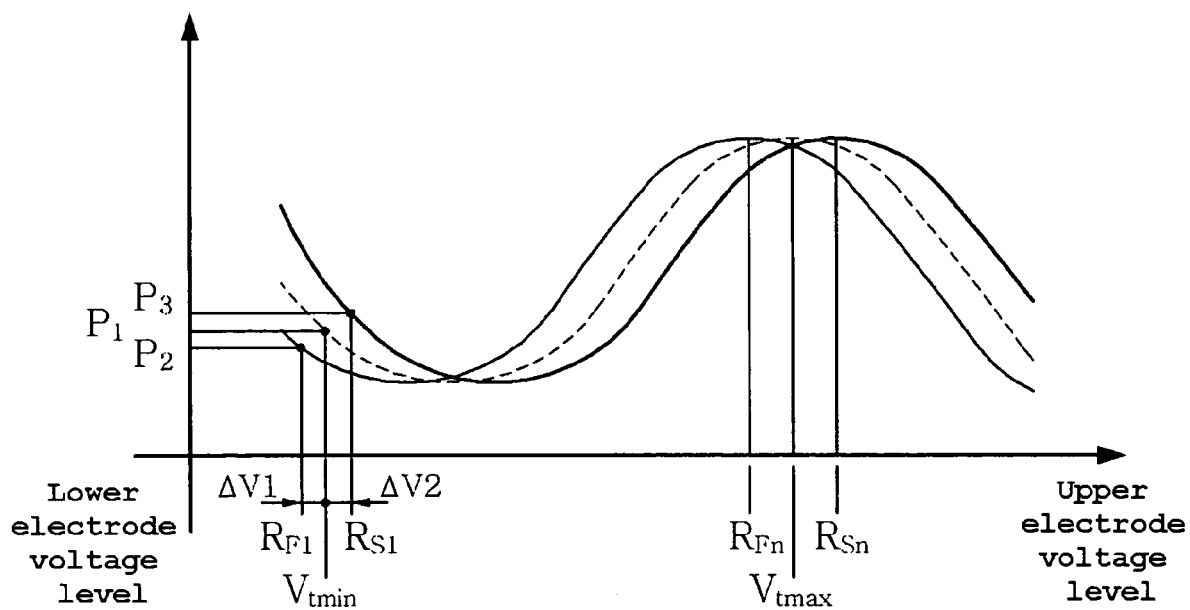
FIG. 13 is a graph illustrating a process in which the reference voltage reset device of FIG. 11 resets a reference voltage.

Thereafter, the light intensity variation detection unit 432 detects the amount of variation in the intensity of light with reference to the light intensity storage unit 431 at step S114. When a gray level of 0 is input to all the elements as illustrated in FIG. 13, light intensity $P_1$ must be output. However, if light intensity $P_2$ is output, a lower voltage must be used in order to obtain an output having desired light intensity. Accordingly, the light intensity variation detection unit 432 outputs the amount of variation in voltage $\Delta V1$. Therefore, the reset unit 433 resets the correction value, stored in the upper electrode reference voltage correction unit 414, to $-\Delta V1$ so that the upper electrode reference voltage can be reset to a value in a range of $R_{F1}$ to $R_{Fn}$ at step S116. The upper electrode reference voltage correction unit 414 subtracts the correction value $\Delta V1$ from the upper electrode reference voltages stored in the gamma reference voltage storage unit 404 when outputting the upper electrode reference voltage, and outputs corrected upper electrode reference voltage values. By doing this, the desired intensity of diffracted light can be obtained.

When a gray level of 0 is input to all the elements, light intensity $P_1$ must be output. However, if light intensity $P_3$ is output, a lower voltage must be used in order to obtain an output having desired light intensity. Accordingly, the light intensity variation detection unit 432 outputs the amount of variation in voltage $\Delta V2$. Therefore, the reset unit 433 resets the correction value, stored in the upper electrode reference voltage correction unit 414, to $\Delta V2$ so that the upper electrode reference voltage may be output as a value in a range of $R_{S1}$ to $R_{Sn}$. The upper electrode reference voltage correction unit 414 adds the correction value $\Delta V2$ to the upper electrode reference voltage, stored in the gamma reference voltage storage unit 404, at the time of outputting the upper electrode reference voltage, and outputs a corrected upper electrode reference voltage value. By doing this, the desired intensity of diffracted light can be obtained.

Figure 14:
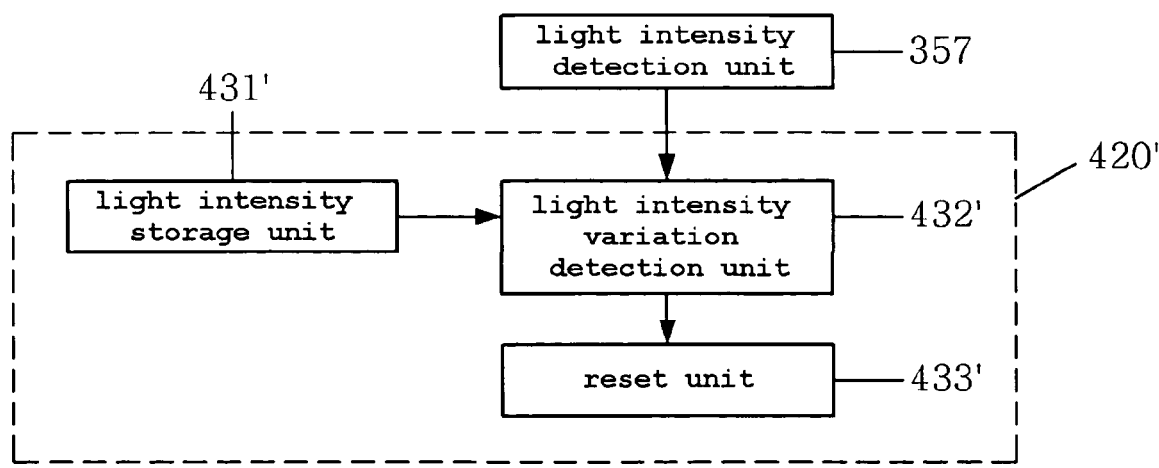
FIG. 14 is an internal block diagram of an apparatus for adjusting applied voltage according to another embodiment of the present invention.
Figure 15:
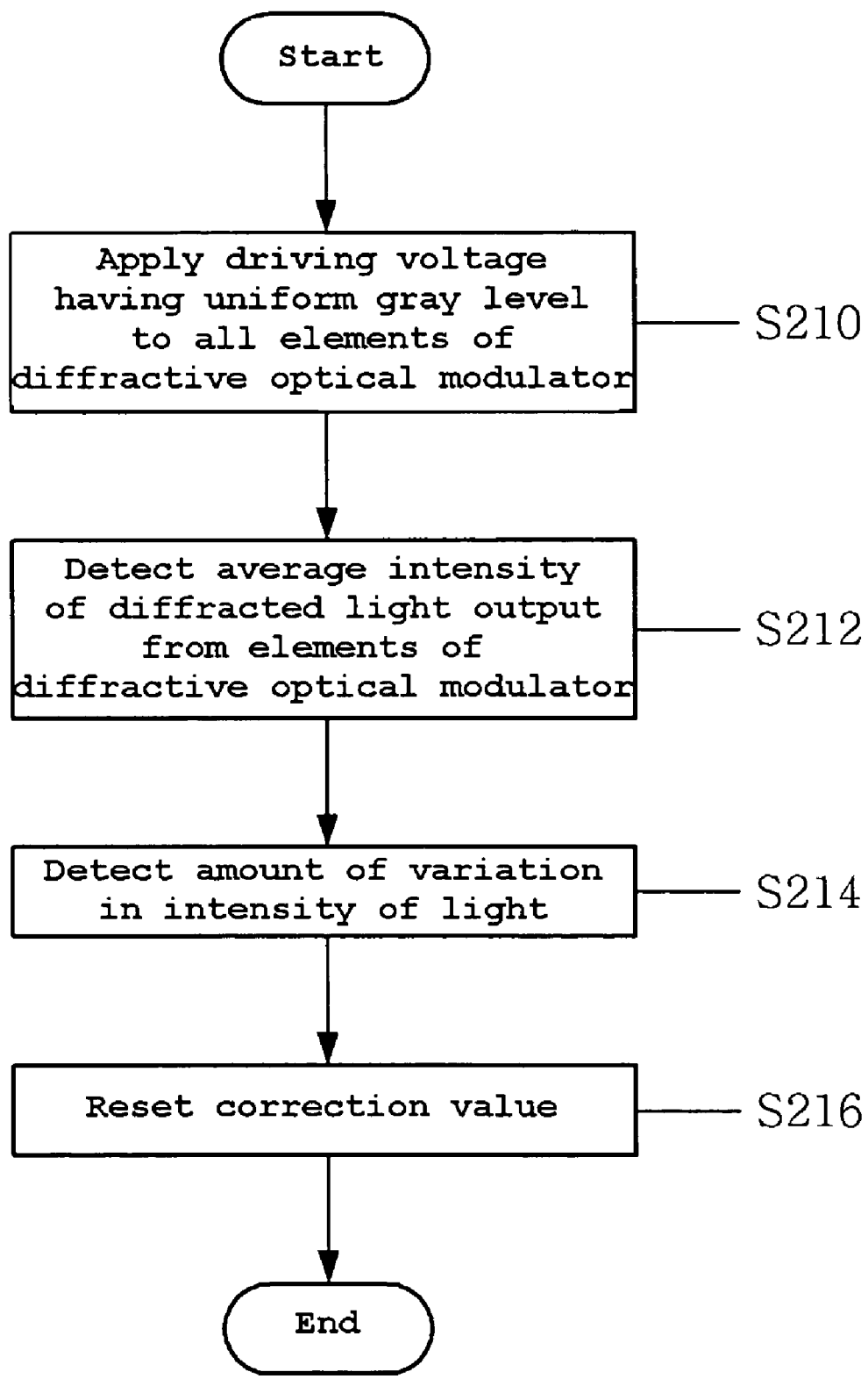
FIG. 15 is a flowchart illustrating a method of adjusting applied voltage according to another embodiment of the present invention.

FIG. 14 is an internal block diagram of an apparatus for adjusting applied voltage according to another embodiment of the present invention. FIG. 15 is a flowchart illustrating a method of adjusting applied voltage according to another embodiment of the present invention.

Referring to the drawings, the apparatus for adjusting applied voltage according to another embodiment of the present invention includes a light intensity detection unit 357 and a reference voltage reset device 420'. The reference voltage reset device 420' includes a light intensity storage unit 431', a light intensity variation detection unit 432' and a reset unit 433'.

A photosensor or the like may be used as the light intensity detection unit 357. When a driving voltage having a uniform gray level is applied to all of the elements of the diffractive optical modulator at step S210, the light intensity detection unit 357 detects the average intensity of diffracted light output from all of the elements of the diffractive optical modulator, and outputs the average intensity of light at step S212.

Figure 16A:
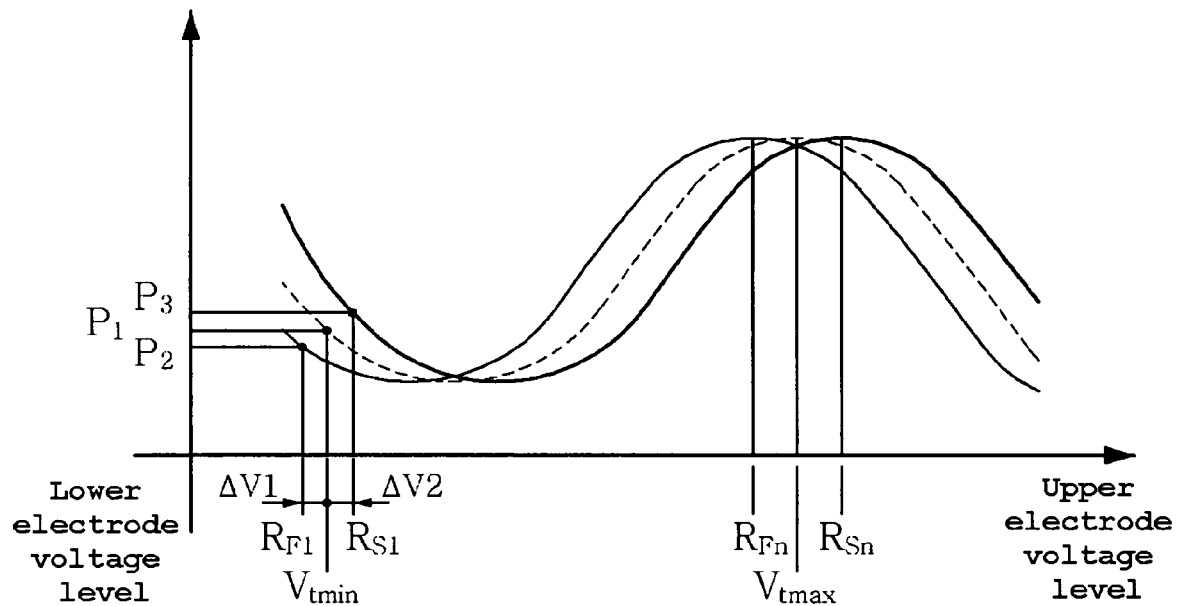
FIGS. 16A and 16B are graphs illustrating a process in which the reference voltage reset device of FIG. 4 resets a reference voltage.
Figure 16B:
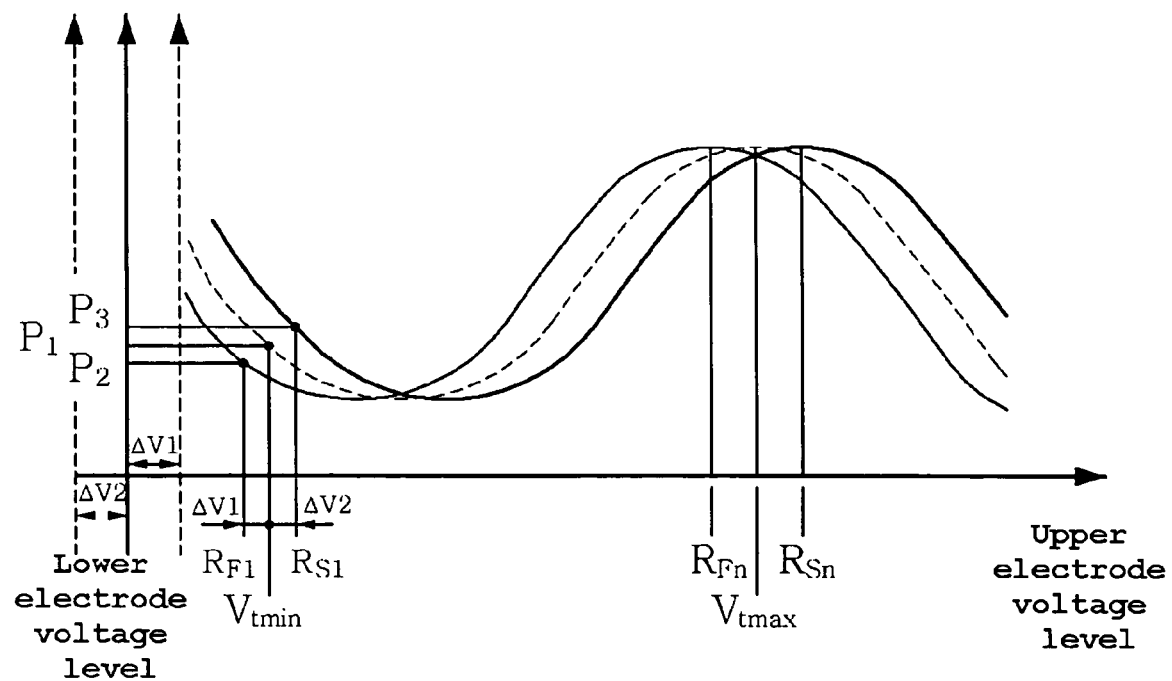

Then, the light intensity variation detection unit 432' detects the amount of variation in the intensity of light with reference to the light intensity storage unit 431' at step S214. When a gray level of 0 is input to all of the elements as illustrated in FIG. 16A, light intensity $P_1$ must be output. However, if light intensity $P_2$ is output, a lower voltage must be used in order to obtain an output having desired light intensity. Accordingly, the light intensity variation detection unit 432' outputs the amount of variation in voltage $\Delta V1$. Therefore, the reset unit 433' resets the correction value, stored in the lower electrode reference voltage correction unit 415', to $\Delta V1$ at step S216, so that the lower electrode reference voltage can increase by $\Delta V1$, as shown in FIG. 16B. By doing this, the lower electrode reference voltage output from the lower electrode reference voltage correction unit 415' moves by $\Delta V1$. Although the upper electrode reference voltage is not adjusted to a value in a range of $V_{tmin}$ to $V_{tmax}$ as illustrated in FIG. 16B, the upper electrode voltage to be applied to upper electrode layer of the element can be set to a value in a range of $R_{F1}$ to $R_{Fn}$, so that it can deal with variation in the dynamic characteristic of the diffractive optical modulator. Therefore, it is possible to obtain an accurate applied voltage that should be applied in order to obtain the desired intensity of diffracted light.

Furthermore, when a gray level of 0 is input to all the elements, light intensity $P_1$ must be output. However, if light intensity $P_3$ is output, a higher voltage must be used in order to obtain an output having desired light intensity. Accordingly, the light intensity variation detection unit 432' outputs the amount of variation in voltage $\Delta V2$.

Then, the reset unit 433' resets the correction value, stored in the lower electrode reference voltage correction unit 415', to $-\Delta V2$ at step S216, so that the lower electrode reference voltage decreases by $\Delta V2$ as illustrated in FIG. 16B. By doing this, the lower electrode reference voltage output from the lower electrode reference voltage correction unit 415' moves by $-\Delta V2$. Although the upper electrode reference voltage is not adjusted to a value in a range of $V_{tmin}$ to $V_{tmax}$, as illustrated in FIG. 16B, the upper electrode voltage to be applied to upper electrode layer of the element can be set to a value in a range of $R_{S1}$ to $R_{Sn}$ so that it can deal with variation in the dynamic characteristic of the diffractive optical modulator. Therefore, it is possible to obtain an accurate applied voltage that should be used in order to obtain the desired intensity of diffracted light.

Although the case where a gray level of 0 is applied to all of the upper reflective parts has been described above, any uniform gray level, such as 0 or 255, may be used.

Meanwhile, a photosensor may be used as the light intensity detection unit 357 in order to detect the intensity of light. The semi-transmissive reflective unit 356 may be placed behind the Schlieren optical unit 354 as illustrated in FIG. 3, and may receive some of the reflected light and detect the intensity of light.

Figure 17:
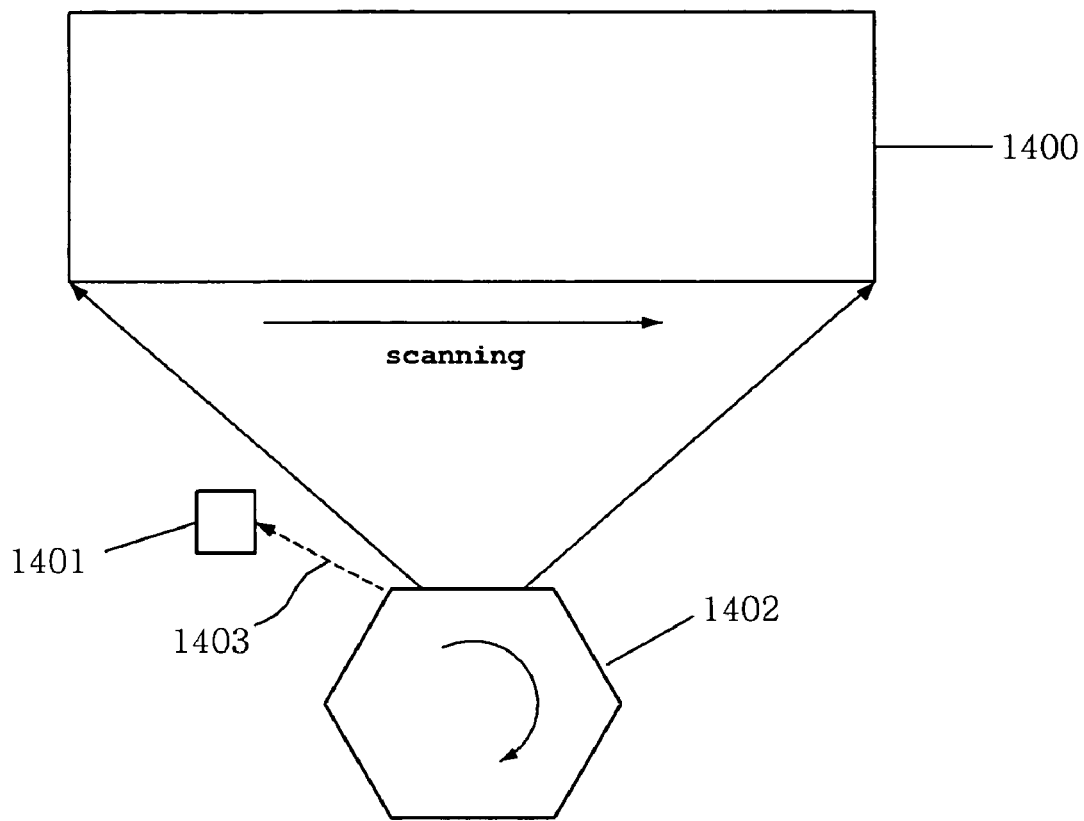
FIG. 17 is a view illustrating a polygon mirror and a photosensor that are used to measure the intensity of light.

Furthermore, in the light intensity detection unit 357 for detecting the intensity of light, a photosensor 1401 maybe placed in front of the screen 1400 as illustrated in FIG. 17 and measures the intensity of diffracted light output from the diffractive optical modulator. In this case, a condensing lens 1403 is disposed in front of the photosensor 1401, thus diffracted light corresponding to all the elements is condensed and the intensity of light can be obtained for all of the diffracted light.

Figure 18:
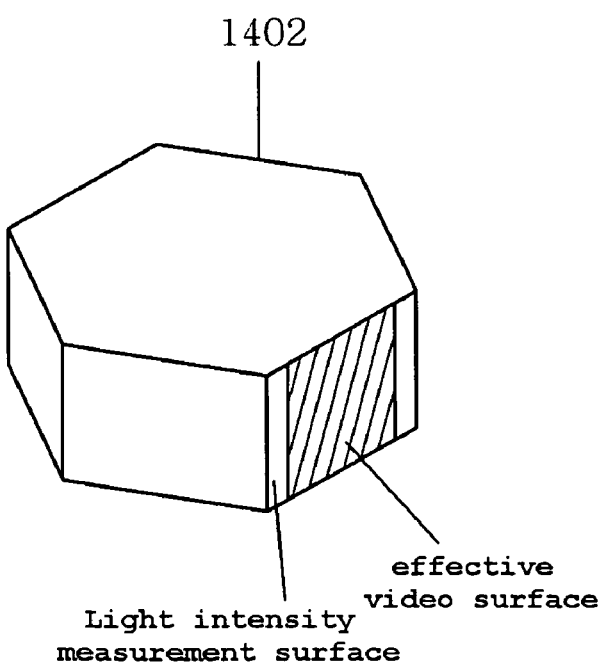
FIG. 18 is an enlarged view of the polygon mirror.

In the case where the projection and scanning optical unit of the optical system uses a polygon mirror 1402, the reflective surface of the polygon mirror 1402 is divided into a light intensity measurement surface and an effective video surface, as illustrated in FIG. 18. If diffracted light is incident on the light intensity measurement surface, the gray levels of all elements of the diffractive optical modulator are set at 0, and the photosensor 1401 is disposed at a location at which it can measure diffracted light reflected from the light intensity measurement surface, and measures the intensity of light. Although the polygon mirror 1402 has been described as an example of the projection and scaring optical unit, a Galvano-meter mirror, a MEMS scanner or the like may be used as the projection and scanning optical unit.

A data timing diagram for gray levels, which are provided for the necessary time by the video correction and control unit 406 in order to measure the intensity of light for adjusting the upper electrode reference voltage as described above, and gray levels, which are provided afterwards, is illustrated in FIG. 19. While diffracted light is incident on the light intensity measurement surface as shown in FIG. 19, R light source 0 gray level data, G light source 0 gray level data or B light source 0 gray level data is provided. While diffracted light is incident on the effective video surface, R video data, G video data or B video data is provided.

As described above, according to the present invention, the intensity of light, which is distorted due to the material/mechanical deformation of the elements of a diffractive optical modulator and other causes, can be corrected. Accordingly, it is possible to maintain picture quality at the time of display for a long period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for adjusting applied voltage in a display system, the apparatus including an optical source system, an illumination optical unit, a diffractive optical modulator, a projection and scanning optical unit and a screen, the diffractive optical modulator having a first reflective part and a second reflective part spaced apart from the first reflective part by a specific distance, generating diffracted light using light reflected from the first and second reflective parts, and varying the specific distance between the first and second reflective parts using a piezoelectric layer made of piezoelectric material, the apparatus comprising:

a light intensity detection unit for measuring an intensity of diffracted light output when the applied voltage is applied to the piezoelectric layer of the diffractive optical modulator, and outputting the measured intensity of the diffracted light; and an applied voltage adjustment unit for applying the applied voltage to the piezoelectric layer of the diffractive optical modulator, receiving the intensity of the diffracted light, which is output from the diffractive optical modulator, from the light intensity detection unit, comparing the received intensity of diffracted light with an expected intensity of light, which is expected to be measured when the applied voltage is applied to the piezoelectric layer of the diffractive optical modulator, and adjusting the applied voltage that must be used in order to obtain a specific light intensity from the diffractive optical modulator.

2. The apparatus as set forth in claim 1, wherein the light intensity detection unit is a photosensor.

3. The apparatus as set forth in claim 1, further comprising a semi-transmissive reflective unit that is disposed behind the diffractive optical modulator and is configured to pass most of the diffracted light therethrough to the projection and scanning optical unit and to pass a remaining part of the diffracted light therethrough to the light intensity detection unit;

wherein the light intensity detection unit measures the intensity of the diffracted light that is incident from the semi-transmissive reflective unit.

4. The apparatus as set forth in claim 3, wherein the light intensity detection unit is a photosensor.

5. The apparatus as set forth in claim 1, wherein the light intensity detection unit is disposed on one side of the screen.

6. The apparatus as set forth in claim 1, wherein:

the piezoelectric layer of the diffractive optical modulator comprises a first electrode layer, a piezoelectric material layer placed on the first electrode layer, and a second electrode layer placed on the piezoelectric material layer; and the applied voltage adjustment unit adjusts a second electrode value applied to the second electrode layer.

7. The apparatus as set forth in claim 6, wherein the applied voltage adjustment unit comprises:

a reference voltage storage unit for storing a second electrode reference voltage to be applied to the second electrode layer of the piezoelectric layer of the diffractive optical modulator, and a first electrode reference voltage to be applied to the first electrode layer;

an applied voltage output unit for adding a correction value to the second electrode reference voltage stored in the reference voltage storage unit and outputting a corrected second electrode reference voltage, and outputting the second electrode reference voltage;

a video control unit for applying the applied voltage to the piezoelectric layer of the diffractive optical modulator; and a reference voltage reset unit for receiving the intensity of diffracted light, which is output from the diffractive optical modulator when the applied voltage is applied to the piezoelectric layer of the diffractive optical modulator, from the light intensity detection unit, comparing the received intensity of light with the expected intensity of light, which is expected to be measured when the applied voltage is applied to the piezoelectric layer of the diffractive optical modulator, and adjusting the correction value of the applied voltage output unit, which is used to adjust the second electrode reference voltage that is stored in the reference voltage storage unit and is applied to the diffractive optical modulator.

8. The apparatus as set forth in claim 7, wherein the applied voltage output unit comprises:
a first electrode voltage correction unit for adding the correction value to the second electrode reference voltage stored in the reference voltage storage unit, and outputting a corrected second electrode reference voltage; and
a first electrode voltage output unit for outputting the first electrode reference voltage stored in the reference voltage storage unit.

9. The apparatus as set forth in claim 7, wherein the reference voltage reset unit comprises:
a light intensity storage unit for storing the expected intensity of light, which is expected to be measured when the applied voltage is applied to the piezoelectric layer of the diffractive optical modulator;
a light intensity variation calculation unit for receiving the intensity of light of diffracted light, which is output from the diffractive optical modulator when the applied voltage is applied to the piezoelectric layer of the diffractive optical modulator, from the light intensity detection unit, comparing the received intensity of light with the expected intensity of light, which is expected to be measured when the applied voltage is applied to the piezoelectric layer of the diffractive optical modulator, and outputting a correction value for controlling the second electrode reference voltage, which is stored in the reference voltage storage unit and must be applied to the diffractive optical modulator; and
a reset unit for adjusting the correction value to be added to the second electrode reference voltage, which is stored in the applied voltage output unit and is applied to the diffractive optical modulator, based on the correction value of the light intensity variation calculation unit.

10. The apparatus as set forth in claim 6, wherein the applied voltage adjustment unit comprises:
a reference voltage storage unit for storing a second electrode reference voltage to be applied to the second electrode layer of the piezoelectric layer of the diffractive optical modulator, and a first electrode reference voltage to be applied to the first electrode layer;
an applied voltage output unit for outputting the second electrode reference voltage and the first electrode reference voltage stored in the reference voltage storage unit;
a video control unit for applying the applied voltage to the piezoelectric layer of the diffractive optical modulator; and
a reference voltage reset unit for receiving the intensity of diffracted light, which is output from the diffractive optical modulator when the applied voltage is applied to the piezoelectric layer of the diffractive optical modulator, from the light intensity detection unit, comparing the received intensity of light with the expected intensity of light, which is expected to be measured when the applied voltage is applied to the piezoelectric layer of the diffractive optical modulator, and adjusting the second electrode reference voltage, which is stored in the reference voltage storage unit and must be applied so as to obtain a specific intensity of light from the diffractive optical modulator.

11. The apparatus as set forth in claim 10, wherein the applied voltage output unit comprises:

a second electrode voltage correction unit for outputting the second electrode reference voltage stored in the reference voltage storage unit; and
a first electrode voltage output unit for outputting the first electrode reference voltage stored in the reference voltage storage unit.

12. The apparatus as set forth in claim 10, wherein the reference voltage reset unit comprises:
a light intensity storage unit for storing the expected intensity of light, which is expected to be measured when the applied voltage is applied to the piezoelectric layer of the diffractive optical modulator;
a light intensity variation calculation unit for receiving the intensity of diffracted light, which is output from the diffractive optical modulator when the applied voltage is applied to the piezoelectric layer of the diffractive optical modulator, from the light intensity detection unit, comparing the received intensity of diffracted light with the expected intensity of light of the light intensity storage unit, which is expected to be measured when the applied voltage is applied to the piezoelectric layer of the diffractive optical modulator, and outputting a correction value for controlling the second electrode reference voltage, which is stored in the reference voltage storage unit and must be applied in order to obtain the specific intensity of light from the diffractive optical modulator; and
a reset unit for adjusting the second electrode reference voltage, which is stored in the reference voltage storage unit and is applied to the diffractive optical modulator, based on the correction value of the light intensity variation calculation unit.

13. The apparatus as set forth in claim 1, wherein:
the piezoelectric layer of the diffractive optical modulator comprises a first electrode layer, a piezoelectric material layer placed on the first electrode layer, and a second electrode layer placed on the piezoelectric material layer; and
the applied voltage adjustment unit adjusts a first electrode value applied to the first electrode layer.

14. The apparatus as set forth in claim 13, wherein the applied voltage adjustment unit comprises:
a reference voltage storage unit for storing a second electrode reference voltage to be applied to the second electrode layer of the diffractive optical modulator and a first electrode reference voltage to be applied to the first electrode layer;
an applied voltage output unit for outputting the second electrode reference voltage stored in the reference voltage storage unit, and adding a correction value to the first electrode reference voltage and outputting a corrected first electrode reference voltage;
a video control unit for applying the applied voltage to the piezoelectric layer of the diffractive optical modulator; and
a reference voltage reset unit for receiving the intensity of diffracted light, which is output from the diffractive optical modulator when the applied voltage is applied to the piezoelectric layer of the diffractive optical modulator, from the light intensity detection unit, comparing the received intensity of light with the expected intensity of light, which is expected to be measured when the applied voltage is applied to the piezoelectric layer of the diffractive optical modulator, and adjusting the correction value of the applied voltage output unit in order to obtain the first electrode reference voltage, which is stored in the reference voltage storage unit and must be applied in order to obtain a specific intensity of light from the diffractive optical modulator.

15. The apparatus as set forth in claim 14, wherein the applied voltage output unit comprises:
   a second electrode voltage output unit for outputting the second electrode reference voltage stored in the reference voltage storage unit; and
   a first electrode voltage correction unit for adding the correction value to the first electrode reference voltage stored in the reference voltage storage unit and outputting a corrected first electrode reference voltage.

16. The apparatus as set forth in claim 14, wherein the reference voltage reset unit comprises:
   a light intensity storage unit for storing the expected intensity of light, which is expected to be measured when the applied voltage is applied to the piezoelectric layer of the diffractive optical modulator;
   a light intensity variation calculation unit for receiving the intensity of diffracted light, which is output from the diffractive optical modulator when the applied voltage is applied to the piezoelectric layer of the diffractive optical modulator, from the light intensity detection unit, comparing the received intensity of light with the expected intensity of light of the light intensity storage unit, which is expected to be measured when the applied voltage is applied to the piezoelectric layer of the diffractive optical modulator, and outputting a correction value for controlling the first electrode reference voltage, which is stored in the reference voltage storage unit and must be applied in order to obtain a specific intensity of light from the diffractive optical modulator; and
   a reset unit for adjusting the correction value, which is stored in the applied voltage output unit and is added to the first electrode reference voltage in order to obtain a specific intensity of light from the diffractive optical modulator, according to the correction value of the light intensity variation calculation unit.

17. The apparatus as set forth in claim 13, wherein the applied voltage adjustment unit comprises:
   a reference voltage storage unit for storing a second electrode reference voltage that must be applied to the second electrode layer of the diffractive optical modulator and a first electrode reference voltage that must be applied to the first electrode layer;
   an applied voltage output unit for outputting the second electrode reference voltage and the first electrode reference voltage stored in the reference voltage storage unit;
   a video control unit for applying an applied voltage to the piezoelectric layer of the diffractive optical modulator; and
   a reference voltage reset unit for receiving the intensity of diffracted light, which is output from the diffractive optical modulator when the applied voltage is applied to the piezoelectric layer of the diffractive optical modulator, from the light intensity detection unit, comparing the received intensity of light with the expected intensity of light, which is expected to be measured when the applied voltage is applied to the piezoelectric layer of the diffractive optical modulator, and adjusting the first electrode reference voltage, which is stored in the reference voltage storage unit and must be applied in order to obtain a specific intensity of light from the diffractive optical modulator.

18. The apparatus as set forth in claim 17, wherein the applied voltage output unit comprises:
   a second electrode voltage output unit for outputting the second electrode reference voltage stored in the reference voltage storage unit; and
   a first electrode voltage correction unit for outputting the first electrode reference voltage stored in the reference voltage storage unit.

19. The apparatus as set forth in claim 17, wherein the reference voltage reset unit comprises:
   a light intensity storage unit for storing the expected intensity of light, which is expected to be measured when the applied voltage is applied to the piezoelectric layer of the diffractive optical modulator;
   a light intensity variation calculation unit for receiving the intensity of light of diffracted light, which is output from the diffractive optical modulator when the applied voltage is applied to the piezoelectric layer of the diffractive optical modulator, from the light intensity detection unit, comparing the received intensity of light with the expected intensity of the light intensity storage unit, which is expected to be measured when the applied voltage is applied to the piezoelectric layer of the diffractive optical modulator, and outputting a correction value for controlling the first electrode reference voltage, which is stored in the reference voltage storage unit and must be applied in order to obtain a specific intensity of light from the diffractive optical modulator; and
   a reset unit for adjusting the first electrode reference voltage, which is stored in the reference voltage storage unit and must be applied in order to obtain a specific intensity of light from the diffractive optical modulator, based on the correction value of the light intensity variation calculation unit.

* * * * *